United States Patent
Davis

[11] Patent Number: 5,963,970
[45] Date of Patent: Oct. 5, 1999

[54] METHOD AND APPARATUS FOR TRACKING ERASE CYCLES UTILIZING ACTIVE AND INACTIVE WEAR BAR BLOCKS HAVING FIRST AND SECOND COUNT FIELDS

[75] Inventor: Derek L. Davis, Phoenix, Ariz.

[73] Assignee: Intel Corporation, Santa Clara, Calif.

[21] Appl. No.: 08/770,958

[22] Filed: Dec. 20, 1996

[51] Int. Cl.$^6$ .............................. G06F 13/00; G06F 12/16; G11C 16/02
[52] U.S. Cl. ......................... 711/103; 711/5; 365/185.11; 365/185.33; 365/185.29; 365/236
[58] Field of Search ................................ 711/103, 5, 157, 711/163, 165; 365/185.11, 185.09, 185.29, 185.23, 218, 236

[56] References Cited

U.S. PATENT DOCUMENTS

| | | | |
|---|---|---|---|
| 4,922,456 | 5/1990 | Naddor et al. | 365/185.09 |
| 5,268,870 | 12/1993 | Harari | 365/218 |
| 5,341,339 | 8/1994 | Wells | 365/218 |
| 5,485,595 | 1/1996 | Assar et al. | 711/103 |
| 5,544,356 | 8/1996 | Robinson et al. | 711/103 |

*Primary Examiner*—Glenn Gossage
*Attorney, Agent, or Firm*—Blakely, Sokoloff, Taylor & Zafman LLP

[57] ABSTRACT

A method and apparatus for keeping track of erase cycles performed on a plurality of storage blocks in a flash memory device. The flash memory device comprises at least two wear-bar blocks (active and inactive) for use in storing a plurality of erase count values representing the erase cycles performed on the plurality of storage blocks. Each wear-bar block includes a plurality of wear-bar storage elements corresponding to each of the plurality of storage blocks. Each wear-bar storage element includes a first count field and a second count field which collectively contain an erase count value. The second count field may be updated by changing from an initial state (SET, e.g.) to a final state (CLEAR, e,g.) without erasure of its corresponding wear-bar block. The first count field is updated in a normal binary sequence each time the second count field reaches a maximum count (e.g., all bits are changed from SET to CLEAR). When that occurs, the contents of the active wear-bar block are transferred to the inactive wear-bar block, the active wear-block is completely erased becoming the inactive wear-bar block, while the previously inactive wear-bar block becomes the active wear-bar block. In this manner, the wear bar blocks will not be worn out before the storage blocks and can be used as a reliable indicator of the number of erase cycles for the storage blocks.

22 Claims, 4 Drawing Sheets

5,963,970

METHOD AND APPARATUS FOR TRACKING ERASE CYCLES UTILIZING ACTIVE AND INACTIVE WEAR BAR BLOCKS HAVING FIRST AND SECOND COUNT FIELDS

BACKGROUND OF THE INVENTION

1. Field of the Invention

The present invention relates to the field of flash memory. More particularly, the present invention relates to a system and method for tracking the number of erased cycles in flash memory to assure that flash blocks nearing their erase cycle limit are not used.

2. Description of Related Art

Flash memory devices have become popular for applications requiring non-volatility and in-circuit programmability. Typically, flash memory devices contain separately erasable flash blocks; namely, each flash block can be erased independently of other flash blocks. In addition, each flash block is designed with a specific "erase cycle limit," being a maximum number of times that the flash block can be erased without an increased probability of experiencing unreliable operations. At the present time, the erase cycle limit of a flash memory device is approximately 100,000 erase cycles per flash block.

In many applications, this limit is well beyond the typical usage of the flash memory device, such as for example, a Basic Input/Output Systems (BIOS) application for a personal computer. However, in those applications supporting a large number of electronic transactions that need to be recorded or stored in the flash memory device, this limit might pose a problem. Examples of applications requiring a large number of erase cycles include digital cash registers, commercial transactions, and banking transactions. In those applications, electronic systems employing flash memory devices may be more vulnerable to sabotage or industrial attack by an intruder artificially generating a high number of transactions in an attempt to exceed the erase cycle limit of the flash memory. The reason for generating these transactions is that overly used memory may provide a better opportunity to successfully compromise the electronic system.

As shown in FIG. 1, in prior art flash memory architectures, a flash memory device 10 is typically partitioned into a number of separate flash blocks which can be individually erased. In this flash architecture, there are 16 flash blocks, each flash block $20_1$–$20_{16}$ having 64 kilobytes ("KB") of memory. Every bit of the flash blocks $20_1$–$20_{16}$ is placed in an initial ("SET") state. Flash memory device 10 is written by changing the state of a bit from its SET state to a desired state. The desired state may be the SET state or an opposite ("CLEAR") state. Typically, bits can only be changed from SET to CLEAR, or remain in the same state. Once a bit is changed from SET to CLEAR, it cannot be changed back to SET unless it is erased. Moreover, the erasure cannot be done for individual bits, rather it is done for the entire flash block $20_y$ (y=1, 2 . . . or 16) which contains that bit. It is this erasure that creates wear on the flash block $20_y$. After some approximate number of erasures (e.g., 100,000 cycles), the flash block is not considered to be reliable.

It is therefore necessary to employ a scheme that keeps track of the number of erasures for specific flash blocks of a flash memory device, or a way to identify specific flash blocks in the flash memory device that are nearing their erase cycle limit. This information can then be used to ensure that such overly used flash memory blocks are not used for storing critical data.

One simple solution to the problem is to include a tracking capability in system software such that every time there is an erasure of the flash memory device, the software will increment a counter, dedicated to that particular flash block, and will store the value of the counter in the hard disk. However, this solution poses a number of problems. First of all, it would create a burden on the software that needs to be written to take into account the tracking capability. Secondly, the software itself might also be vulnerable to other attacks. It is more desirable to have a capability of keeping track of the erasures using hardware or firmware embedded within a flash memory device.

SUMMARY OF THE INVENTION

The present invention relates to a system and method for keeping track of erase cyles of a number of storage blocks in a flash memory device. In one embodiment, the method comprises providing at least two storage blocks of the flash memory device to represent at least two wear-bar blocks for use in storing a plurality of erase count values representing the erase cycles performed on the plurality of storage blocks. Also, each of the at least two wear-bar blocks is configured to include a plurality of wear-bar storage elements corresponding to the plurality of storage blocks. Each of the plurality of wear-bar storage elements including a first count field and a second count field which collectively contain one of the plurality of erase count values. The second count field being updated without erasure of the corresponding wear-bar block. In addition, each of the plurality of erase count values is updated when one of the plurality of second count fields reaches a maximum count.

BRIEF DESCRIPTION OF THE DRAWINGS

The advantages of the present invention will become more readily apparent to those ordinarily skilled in the art after reviewing the following detailed description and accompanying drawings, wherein.

DESCRIPTION OF THE PREFERRED EMBODIMENT

The present invention is directed to a system and method for keeping track of the number of erase cycles for each storage block in a flash memory device so that the wear-out condition of the storage blocks in the flash memory device can be reliably obtained. In general, the system involves the use of a plurality of flash blocks of the flash memory device that are dedicated to keeping track of the number of erasures for each flash block used to store data ("storage block"). These plurality of flash blocks, referred to as "wear-bar blocks," include a plurality of wear-bar storage elements (e.g., registers), each being uniquely associated with a storage block. At any point in time, at least one wear-bar block is active and the other wear-bar block is inactive. The active wear-bar block maintains the erase count values identifying the number of erase cycles undertaken by of all the storage blocks. The inactive wear-bar block contains all erased bits.

Each time a storage block is erased, its erase count value (defined below), contained in a wear-bar storage element, corresponding to the storage block, is updated. The update is performed without erasing the wear-bar storage element as frequently as its corresponding storage block by dividing the wear-bar storage element into a first field and a second field. The second field, including "n" bits ("n" being a positive whole number >1), is updated by modifying the bit pattern at different bit positions, thereby avoiding its need to be erased. When all "n" bits are updated, the first field is updated in normal binary counting sequence, requiring an erasure. This updating of the first field is done by transferring the contents of the active wear-bar block to the inactive wear-bar block with the updated value of a first field. Thereafter, the active wear-bar block is completely erased and becomes the inactive wear-bar block while the wear-bar block containing the updated value of the first field now becomes the active wear-bar block. The role of the two wear-bar blocks is reversed every time a first field associated with a wear-bar storage element requires updating. Therefore, the number of erase cycles for the wear-bar blocks is less than that of the storage blocks such that the erase count values in the wear-bar storage elements are reliable throughout the useful life of the flash memory device.

Figure 1:
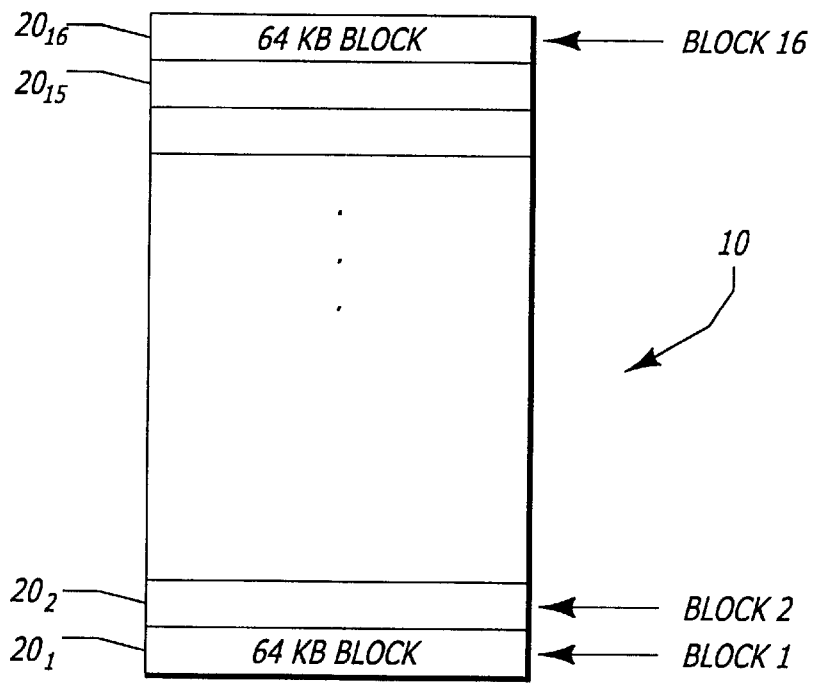
FIG. 1 is a diagram of prior art memory map of flash memory architecture.
Figure 2:
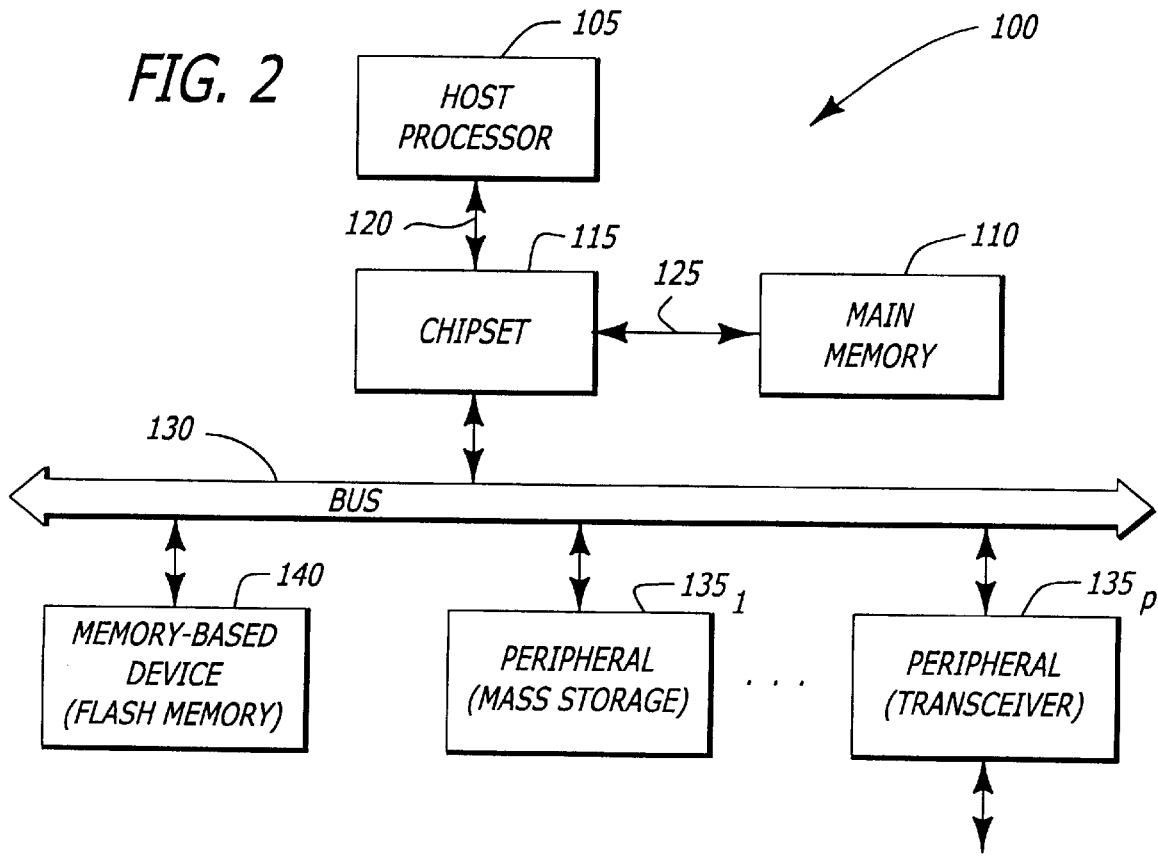
FIG. 2 is an illustrative block diagram of a system implemented with a memory-based device designed and operating in accordance with the present invention.

Referring now to FIG. 2, an illustrative embodiment of an electronic system utilizing the present invention is shown. Herein, the electronic system may be designed as a computer, a hard copy device (e.g., printer, plotter, facsimile machine, etc.), digital cash machine, ATM machine, and the like. In this embodiment, the electronic system 100 comprises a host processor 105 and a main memory element 110 (e.g., dynamic random access memory "DRAM", static random access memory "SRAM", etc.) coupled together by a chipset 115. The chipset 115 operates as an interface between a plurality of buses, namely a host bus 120, a memory bus 125 and bus 130.

The bus 130 provides a communication path between the host processor 105 or main memory 110 and a plurality of peripheral devices $135_1$–$135_p$ ("p" being a positive whole number). The bus 130 may include a Peripheral Component Interconnect ("PCI") bus, Industry Standard Architecture ("ISA") bus or any other type of bus architecture. It is contemplated that bus 130 is shown as a single bus (e.g., PCI bus), but it may be multiple buses coupled together through bridge circuitry in which each peripheral device $135_1$–$135_p$ is coupled to at least one of the multiple buses. Additionally, peripheral devices $135_1$–$135_p$ may include, but are not limited to, a mass storage device $135_1$ (e.g., a hard disk drive, a CD ROM player, CD recordable player, digital tape drive, a floppy disk drive, a digital video disk player, etc.), a transceiver device $135_p$ (e.g., a network interface circuit card, a modem card, etc.) and the like.

Beside the peripheral devices $135_1$–$135_p$, a flash memory device 140 is coupled to the bus 130. The flash memory device 140 is an integrated circuit ("IC") device including flash memory featuring wear-bar technology of the present invention or a flash memory device as a separate component. In either instance, as discussed below, the flash memory device 140 would require well-known hardware (e.g., a processor, state machine, controller, discrete logic circuitry, etc.), and perhaps support software, to control the setting of bits representing the erase count values within wear-bar storage elements of wear-bar blocks as well as the manipulation of data between multiple wear-bar blocks. It is contemplated, however, that the use of wear-bar blocks to monitor erase cycle limits of flash memory may be utilized by other components of the electronic system 100 that may be considered "flash memory devices" such as the host processor 105, one of the peripherals $135_1$–$135_p$, or any other device utilizing flash memory.

Figure 3:
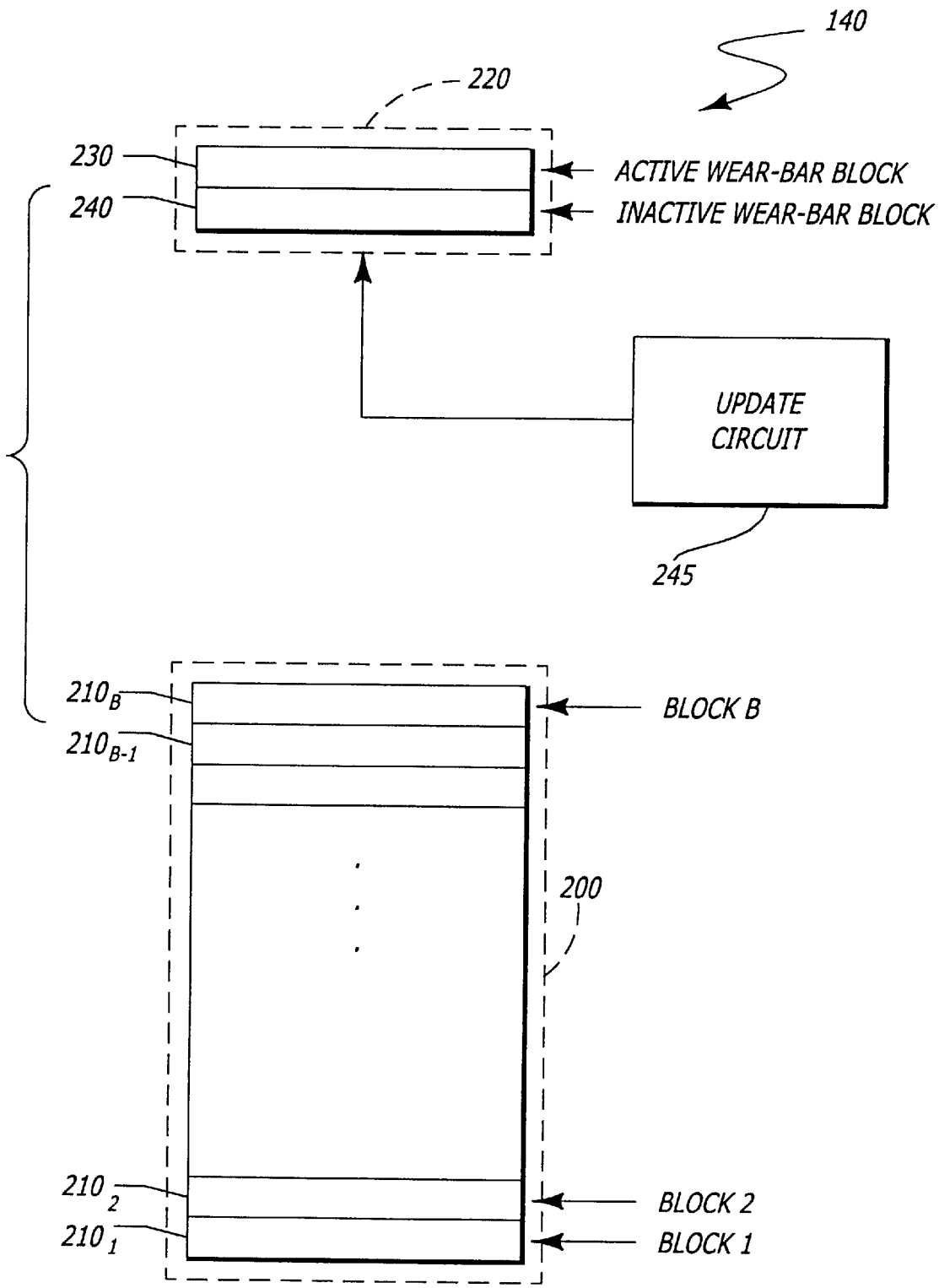
FIG. 3 is an illustrative block diagram showing the memory map of the present invention.

Referring to FIG. 3, an illustrative embodiment of the memory architecture of flash memory implemented within the flash memory device 140 of FIG. 2 is shown. The flash memory device comprises two sections: a storage section 200 and a wear-bar section 220. Storage section 200 may be implemented with B flash storage blocks, $210_1$–$210_B$ ("B" being a positive whole number, B>1) used for data storage. The wear-bar section 220 includes at least two additional flash blocks (e.g., wear-bar blocks 230 and 240), to keep track of the number of erasures for each flash storage block $210_1$ . . . $210_B$. It is contemplated that these wear-bar blocks 230 and 240 may be configured to have a bit size identical to the storage blocks $210_1$–$210_B$, although other bit sizes may be used. Additionally, the wear-bar blocks 230 and 240 may be flash blocks originally designated to be used as storage flash blocks but now reserved for erase count value calculations, or may be additional flash blocks implemented within an integrated circuit ("IC") package of the flash memory device.

The wear-bar blocks 230 and 240 operate so that at any time, one wear-bar block will be "active" (e.g., wear-bar block 230) and the other wear-bar block 240 will be "inactive". The active wear-bar block 230 is the one that currently contains valid information regarding the number of erasures for specific storage blocks (referred to as "erase count values"). The inactive wear-bar block 240 contains erased bits. The roles of the active and inactive wear-bar blocks 230 and 240 will be exchanged at a proper time when erasure of the active wear-bar block 230 is necessary to update the erase count values. As mentioned, an update circuit (e.g., a processor, state machine, controller, discrete logic curcuitry, etc.) and perhaps support software, updates the erase count values wear-bar section 220 FIG. 3.

Figure 4:
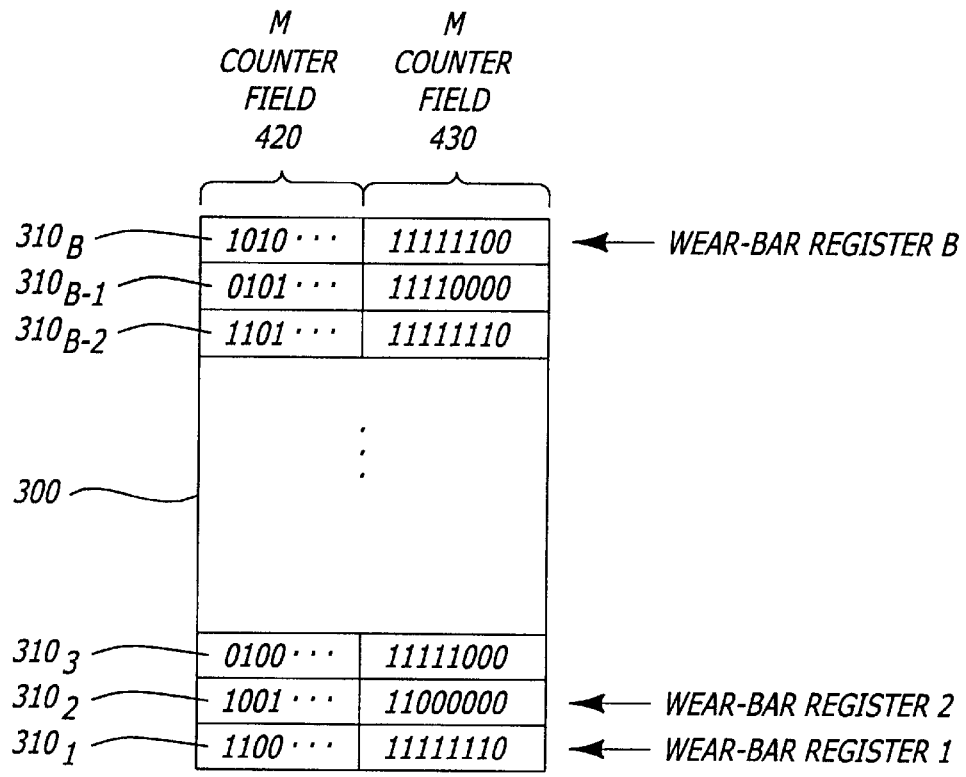
FIG. 4 is an illustrative block diagram showing the organization of a pair of wear-bar blocks.
Figure 4:
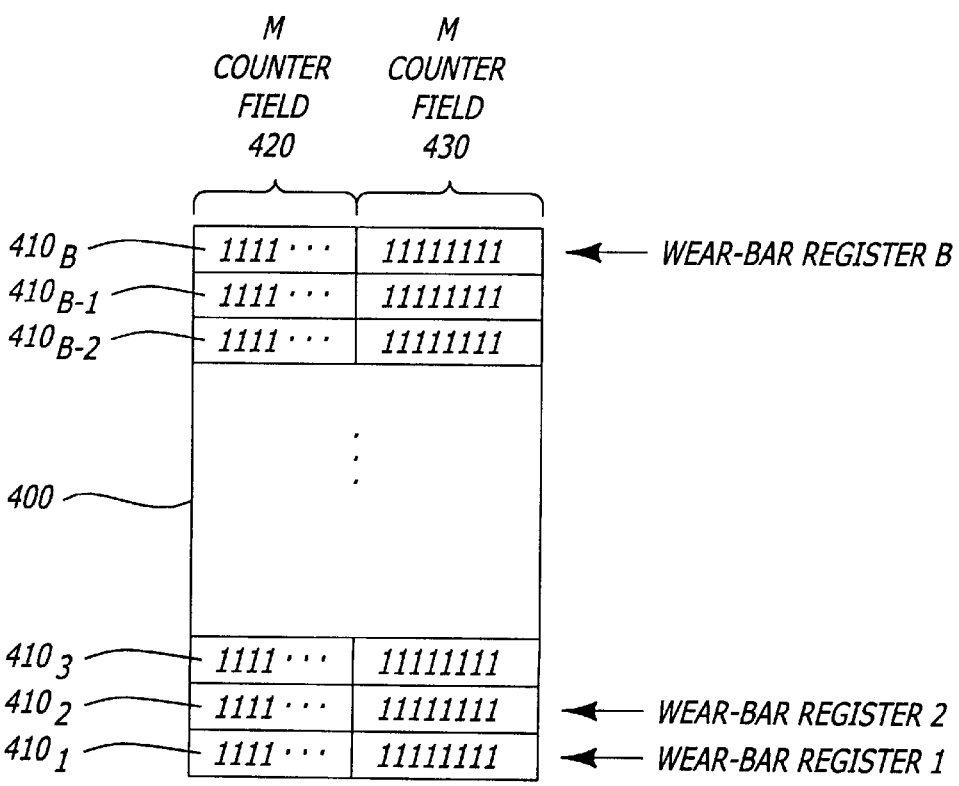

FIG. 4 shows an illustrative embodiment of the organization of a pair of wear-bar blocks in which wear-bar block 300 is active and wear-bar block 400 is inactive. Since there are B storage blocks available, each wear-bar block 300 and 400 contains B wear-bar storage elements $310_1$–$310_B$ and $410_1$–$410_B$, respectively. Each wear-bar storage element of the wear-bar block uniquely corresponds to a storage block and is configured to contain the erase count value associated with its corresponding storage block. This erase count value is updated such that the wear-bar block is erased much less frequently than its corresponding storage block. Therefore, this erase count value cannot simply be the binary number representing the number of times the block is erased. This is because a binary counter, when updated, would require the erasure of the entire wear-bar block. If the number of erase cycles is $2^x$, then $2^x$ erasures of the wear-bar block would be required just to track the number of erase cycles for a single storage block. If there are B storage blocks, the wear-bar block would be subjected to $B \times 2^x$ erasures, exceeding the reliable life of the wear-bar block itself. To avoid this problem, each wear-bar storage element is organized such that updating its erase count value requires only infrequent erasure of the wear-bar block. One technique used to avoid this problem is explained below.

As shown in FIG. 4, each wear-bar storage element $310_1$–$310_B$, $410_1$–$410_B$ is logically partitioned into two fields; namely, a first field being an m-bit counter field ("MCOUNTER field") 420 and a second field being an n-bit counter field ("NCOUNTER field") 430 where both "m" and "n" are positive whole numbers. MCOUNTER field 420 operates as a normal binary counter. In other words, the total number of counts that the MCOUNTER field 420 can reach is equal to $2^m-1$. On the other hand, NCOUNTER field 430 produces an erase count value equal to the number of bits that are in the CLEAR state in its field. Initially, all the bits in the wear-bar blocks are in the SET state. Thus, the maximum number of counts that NCOUNTER field 430 can generate is equal to "n". When the corresponding storage block is erased for the first time, the Least Significant Bit ("LSB") of NCOUNTER field 430 is changed from the SET state to the CLEAR state. When the same storage block is erased for the second time, the next LSB will change from the SET state to the CLEAR state. At count 3, the further next LSB will be changed, and so on. In other words, NCOUNTER field 430 is updated in such a way that only the SET state is changed to the CLEAR state, not vice versa. Note that this incremental update of the NCOUNTER field 430 does not require erasure of the wear-bar block.

After all "n" bits are changed from the SET state to the CLEAR state for a particular storage block, no further incremental modifications are possible in the NCOUNTER field 430. The next count is recorded by updating the MCOUNTER field 420 in a normal binary count sequence, while the NCOUNTER field 430 is returned to the all "SET" condition. This requires an erasure of the wear-bar block. Therefore, the maximum number of erasures of the specified storage block that can be maintained will be equal to $2^m\times(n+1)$; however, the total number of required erasures in order to update the entire count will be equal to $2^m$ only. To erase a wear-bar storage element for updating, the entire flash block containing that wear-bar storage element has to be erased because storage elements cannot be individually erased in a flash memory device. Since a flash block is erased in its entirety, it is necessary to keep another copy of the currently valid wear-bar block in another wear-bar block. The currently valid wear-bar block is referred to as the active wear-bar block.

Before erasing the entire active wear-bar block to update a particular MCOUNTER field, the contents of the entire active wear-bar block (including the required MCOUNTER and NCOUNTER updates) are transferred to the inactive wear-bar block so that valid information is maintained. After the active wear-bar block is erased, it becomes inactive and the previously inactive wear-bar block, which now contains the updated version of the previously active wear-bar block, will become active. The process continues and the roles of the two wear-bar blocks are reversed every time one of the MCOUNTER fields 420 is updated.

Figure 5:
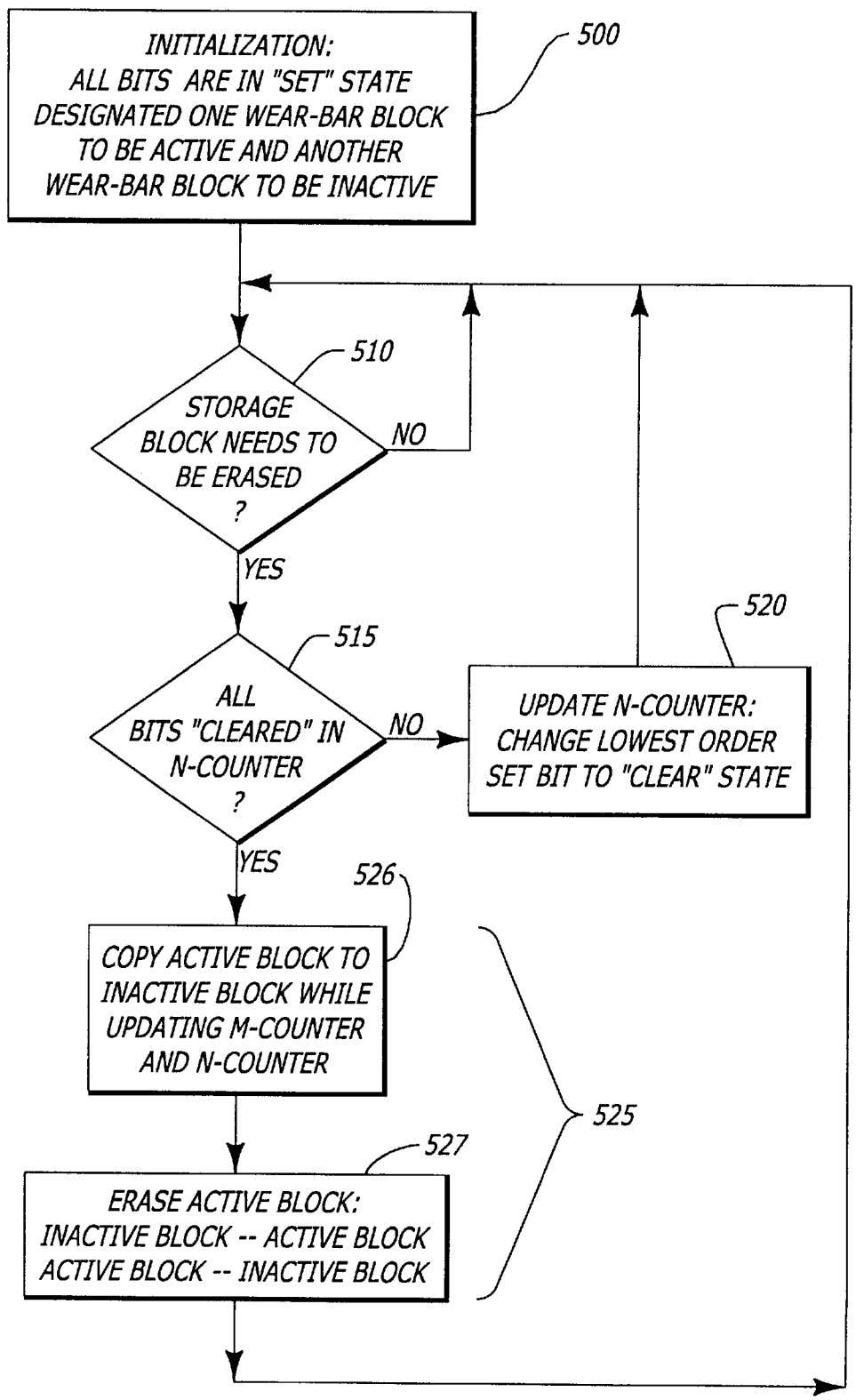
FIG. 5 is a flow chart showing how the pair of wear-bar blocks keep track of the erasures of storage blocks.

FIG. 5 shows the flow chart of this changing between the active and inactive wear-bar blocks. Referring to FIG. 5, initially, one wear-bar block is designated as active and another wear-bar block is designated as inactive, and all bits in both wear-bar blocks are in the initial state, e.g., they are in the SET state (step 500). Now, with respect to a particular storage block and its associated wear-bar storage element, a determination is made whether the storage block needs to erased (step 510). If not, the active wear-bar block is not updated. If the storage block needs to be erased, a determination is made as to whether the entire NCOUNTER field has been exhausted or whether a maximum count has been reached by checking whether all bits of the NCOUNTER field have been placed in the CLEAR state (step 515). If not, the corresponding wear-bar storage element in the wear-bar block is updated by. clearing the lowest order "SET" bit of the NCOUNTER field (step 520) and returning to monitor whether the storage block requires another erasure. However, if the maximum count has been reached, the role reversal between the active wear-bar block and the inactive wear-bar block is performed (step 525).

More particularly, the role reversal includes a number of sub-steps. First, the contents of the entire active wear-bar block is copied to the inactive wear-bar block while the MCOUNTER and NCOUNTER fields are updated (step 526). After the entire active wear-bar block has been transferred to the previously inactive wear-bar block, the active wear-bar block is erased (step 527). Thus, the previously active wear-bar block now becomes the inactive wear-bar block. The process continues by monitoring whether the storage block again needs to be erased.

The number of erase cycles that can be tracked for a specific flash storage block is then equal to $2^m\times(n+1)$. The size of the NCOUNTER and MCOUNTER determines the maximum number of erasures that each wear-bar block undergoes before the corresponding storage block reaches its maximum limit. Let E be the maximum number of erase cycles that each storage block can undergo. Then, the number of times that a wear-bar block is erased, due to erasures of a specific storage block, is $$\frac{E}{n+1}.$$

For all B storage blocks, this totals to $$B\times\frac{E}{n+1}.$$

Since these erasures are distributed over two wear-bar blocks, the number of erasures that each wear-bar block is exposed to is only half of it or $$0.5\times B\times\frac{E}{n+1}.$$

By choosing "n" so that the quantity $$0.5\times\frac{B}{n+1}$$

is less than 1, it is assured that the wear-bar blocks themselves are never worn out because each will never be erased more than "E" times. A specific example will now be used to illustrate how to select the value of n. Assume that there are 40 storage blocks and the maximum number of erase cycles is 100,000, so B=40
E=100,000
We can chose n=48 so that $$0.5\times\frac{B}{n+1}\approx 0.41.$$

This means the each wear-bar block will never be erased more than 41,000 times, well below the 100,000 limit. If m is 16, then $2^m\times(n+1)=3,211,264$, which is well above the 100,000 erase cycle limit. The above example illustrates that by selecting appropriate values for n and m, it is guaranteed that the wear-bar blocks can never be worn out before the storage blocks and they can be used as a reliable indicator of the number of erasing cycles for the storage blocks.

It is contemplated that if the MCOUNTER field is implemented as a decremental counter, the number of erasures of a wear-bar block can be reduced by taking advantage of the fact that the lower order bit can be modified from the SET state to a CLEAR state without requiring an erasure.

At the system level, software can now be written to read the wear-bar blocks and determine if any storage block has been worn out due to excessive erasures. Since the wear-bar blocks themselves are embedded within the flash memory device, there is no need for the system software to keep track of the number of erasures on disk. This can simplify system software significantly.

The above description is intended for illustrative purpose. Many variations can be made. For example, in the MCOUNTER, the updating can start from the LSB to the most significant bit ("MSB") or from the MSB to the LSB or even in any order. Similarly, instead of having two wear-bar blocks, more wear-bar blocks might be available to provide additional information on the history of the erasure of the storage blocks.

While this invention has been described with reference to various embodiments, this description is not intended to be construed in a limiting sense. Various modifications of these embodiments, as well as other embodiments of the invention, which are apparent to persons skilled in the art to which the invention pertains, are deemed to lie with the spirit and scope of the invention.

What is claimed is:

1. A method for keeping track of erase cycles performed on a plurality of storage blocks in a flash memory device, the method comprising:
    providing at least two storage blocks of the flash memory device to represent at least two wear-bar blocks for use in storing a plurality of erase count values representing the erase cycles performed on the plurality of storage blocks;
    configuring each of the at least two wear-bar blocks to include a plurality of wear-bar storage elements corresponding to the plurality of storage blocks, each of the plurality of wear-bar storage elements including a first count field and a second count field which collectively contain one of the plurality of erase count values, the second count field being updated without erasure of the corresponding wear-bar block; and
    updating each of the plurality of erase count values when one of the plurality of second count fields reaches a maximum count.

2. The method of claim 1, wherein prior to updating each of the plurality of erase count values, the method comprises placing a first wear-bar block of said at least two wear-bar blocks into an active state and a second wear-bar block of said at least two wear-bar blocks into an inactive state.

3. The method of claim 2, wherein the updating of the second count field includes modifying a state of a least significant bit of a selected second count field of a wear-bar storage element of the first wear-bar block from a first state to a second state in order to increment an erase count value, represented by a value of the second count field and its corresponding first count field, when a storage block associated with the erase count value is erased.

4. The method of claim 3, wherein the updating of the second count field further includes modifying a next significant bit of the selected second count field from the first state to the second state.

5. The method of claim 2, wherein the updating of each of the plurality of erase count values comprises:
    copying contents of the first wear-bar block to the second wear-bar block when the one of the plurality of second count fields reaches the maximum count; and
    updating the contents of the one of the plurality of second count fields and its corresponding first count field.

6. The method of claim 5, wherein the updating of the one of the plurality of second count fields and its corresponding first count field includes
    incrementing the corresponding first count field in accordance with a binary counting sequence; and
    placing each bit of the one of the plurality of second count fields in the first state.

7. The method of claim 5 further comprising erasing the first wear-bar block after updating the one of the plurality of second count fields and the corresponding first count field.

8. The method of claim 7 wherein the second wear-bar block is placed in the active state after updating the one of the plurality of second count fields and the corresponding first count field.

9. A flash memory device comprising:
    a plurality of storage blocks including at least two wear-bar blocks, each wear-bar block including a plurality of wear-bar storage elements corresponding to the plurality of storage blocks, each wear-bar storage element to contain an erase count value to indicate how many erase cycles have been performed on a corresponding storage block, corresponding ones of the plurality of wear-bar storage elements including a first count field and a second count field which collectively contain the erase count value, the second count field being updated when the corresponding storage block is erased, without requiring an erasure of the wear-bar block associated with the corresponding storage block until the second count field reaches a maximum count, and the first count field being updated each time the second count field reaches the maximum count; and
    circuitry for updating each of the plurality of erase count values when the corresponding second count field reaches the maximum count.

10. The flash memory device of claim 9, wherein the at least two wear-bar blocks comprise a first wear-bar block in an active state and a second wear-bar block in an inactive state.

11. The flash memory device of claim 10 wherein each time the maximum count is reached, contents of the first wear-bar block containing an updated erase count value are copied to the second wear-bar block.

12. The flash memory device of claim 11 wherein after contents of the first wear-bar block are copied to the second wear-bar block, the first wear-bar block is erased.

13. A system comprising:
    a processor; and
    a flash memory device coupled to the processor, the flash memory device including
        a plurality of storage blocks, and
        a plurality of wear-bar blocks, each of the plurality of wear-bar blocks including a plurality of wear-bar storage elements, each uniquely corresponding to a storage block of the plurality of storage blocks for storage of an erase count value representing how many erase cycles have been undertaken by the corresponding storage block, each wear-bar storage element including a first count field and a second count field, that collectively contain the erase count value, the second count field being updated when the corresponding storage block is erased, without requiring an erasure of the wear-bar block associated with the corresponding storage block.

14. The system of claim 13 wherein each time a maximum count is reached by the first count field, contents of a first wear-bar block of the plurality of wear-bar blocks, containing an updated erase count value, are copied to a second wear-bar block of the plurality of wear-bar blocks.

15. The system of claim 14 wherein after contents of the first wear-bar block are copied to the second wear-bar block, the first wear-bar block is erased.

16. A system comprising:

a processor; and a memory device coupled to the processor and including a plurality of storage blocks and at least two wear-bar blocks including a first wear-bar block placed in an active state and a second wear-bar block placed in an inactive state, each wear-bar block including a plurality of count fields for each of the plurality of storage blocks and stored contents in each of the plurality of count fields representing an erase count value for one of the plurality of storage blocks, the count fields for a first storage block of the plurality of storage blocks including a first count field updated each time the first storage block is erased without erasure of the corresponding wear-bar block and a second count field to update a corresponding erase count value each time the first count field reaches a maximum count, the first and second count fields collectively containing the erase count value for the corresponding one of the storage blocks.

17. A method for monitoring of erase cycles performed on a non-volatile memory having a plurality of storage blocks, the method comprising:

providing at least two wear-bar storage blocks in the non-volatile memory to store an erase count value representing a number of erase cycles performed on a storage block of the plurality of storage blocks;

providing a wear-bar storage element within a first wear-bar storage block of the at least two wear-bar storage blocks, the wear-bar storage element including a first count field and a second count field to collectively contain the erase count value; and updating the second count field of the wear-bar storage element of the first wear-bar storage block without erasure of the first wear-bar block when a storage block corresponding to the wear-bar storage element undergoes an erase cycle.

18. The method of claim 17, wherein the wear-bar storage element is one of a plurality of wear-bar storage elements associated with the plurality of storage blocks.

19. The method of claim 17 further comprising:

updating the erase count value when the second count field reaches a maximum count.

20. The method of claim 19, wherein the updating of the erase count value further comprises:

copying contents of the first wear-bar block into the second wear-bar block; and updating contents of count fields of a wear-bar storage element of the second wear-bar storage block corresponding to the wear-bar storage element of the first wear-bar storage block.

21. The method of claim 20, wherein the updating of the contents of the count fields of the wear-bar storage element of the second wear-bar storage block comprises:

incrementing a first count field of the wear-bar storage element of the second wear-bar storage block in accordance with a binary counting sequence; and placing each bit of the second count field of the wear-bar storage element of the second wear-bar storage block in a first state.

22. The method of claim 21, wherein the updating of the erase count value further comprises:

placing the second wear-bar storage block of the at least two wear-bar storage blocks into an active state, and placing the first wear-bar storage block of the at least two wear-bar storage blocks into an inactive state.

* * * * *